United States Patent
Altman et al.

(10) Patent No.: US 9,720,521 B2
(45) Date of Patent: Aug. 1, 2017

(54) IN-AIR ULTRASOUND PEN GESTURES

(71) Applicant: QUALCOMM Incorporated, San Diego, CA (US)

(72) Inventors: Nathan Altman, San Diego, CA (US); Niccolo Padovani, San Diego, CA (US); Gilad Bornstein, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 14/626,198

(22) Filed: Feb. 19, 2015

(65) Prior Publication Data
US 2015/0242002 A1 Aug. 27, 2015

Related U.S. Application Data

(60) Provisional application No. 61/943,261, filed on Feb. 21, 2014.

(51) Int. Cl.
*G06F 3/043* (2006.01)
*G06F 3/0354* (2013.01)
*G06F 3/01* (2006.01)
*G06F 3/0488* (2013.01)
*G06F 3/0346* (2013.01)

(52) U.S. Cl.
CPC .......... *G06F 3/03545* (2013.01); *G06F 3/017* (2013.01); *G06F 3/0346* (2013.01); *G06F 3/043* (2013.01); *G06F 3/0488* (2013.01); *G06F 3/04883* (2013.01)

(58) Field of Classification Search
CPC .... G06F 3/03545; G06F 3/043; G06F 3/0433; G06F 3/0346; G06F 3/046; G06F 2203/04101
USPC .......... 345/179, 173, 177; 178/18.01, 19.02, 178/18.04, 19.01
See application file for complete search history.

(56) References Cited

U.S. PATENT DOCUMENTS 5,239,139 A   8/1993 Zuta
5,308,936 A * 5/1994 Biggs ..................... G06F 3/043
                                          178/18.04

(Continued)

FOREIGN PATENT DOCUMENTS

WO   2013049286 A1   4/2013

OTHER PUBLICATIONS

Bi X., et al., "An Exploration of Pen Rolling for Pen-Based Interaction", Proceedings of the 21st Annual ACM Symposium on User Interface Software and Technology, UIST '08, Oct. 22, 2008 (Oct. 22, 2008), p. 191, XP055091713, New York, USA, DOI: 10.1145/1449715.1449745 ISBN: 978-1-59-593975-3.
International Search Report and Written Opinion—PCT/US2015/016758—ISA/EPO—Jun. 1, 2015.

(Continued)

*Primary Examiner* — Koosha Sharifi-Tafreshi
(74) *Attorney, Agent, or Firm* — MG-IP Law, P.C.

(57) ABSTRACT

Implementations of the technology described herein provide a method for detecting gesture commands using an ultrasonic pen system. The system has a pen and a user device. Detection of gesture commands is based on two-dimensional gestures relative to the screen of a user device, three-dimensional gestures relative to the screen of the user device, roll/rotation around a longitudinal axis of the pen body, and micro-twisting around the longitudinal axis of the pen body. The user device receives the gestures and translates them into commands such as UNDO and BACK.

12 Claims, 6 Drawing Sheets

(56) References Cited

U.S. PATENT DOCUMENTS

| | | | | |
|---|---|---|---|---|
| 5,809,267 | A * | 9/1998 | Moran | G06F 3/04883 715/863 |
| 8,730,190 | B2 | 5/2014 | Moloney | |
| 2002/0084114 | A1 | 7/2002 | Xu et al. | |
| 2002/0130850 | A1* | 9/2002 | Kobayashi | G06F 3/0346 345/180 |
| 2004/0032399 | A1* | 2/2004 | Sekiguchi | G06F 3/03545 345/173 |
| 2004/0240739 | A1 | 12/2004 | Chang et al. | |
| 2005/0091297 | A1* | 4/2005 | Sato | G06F 3/0346 708/442 |
| 2006/0267966 | A1* | 11/2006 | Grossman | G06F 3/0346 345/179 |
| 2006/0290682 | A1* | 12/2006 | Ake | G06F 3/0433 345/173 |
| 2009/0044153 | A1* | 2/2009 | Lindberg | G06F 3/03545 715/864 |
| 2013/0257777 | A1* | 10/2013 | Benko | G06F 3/03545 345/173 |
| 2013/0321348 | A1 | 12/2013 | Takahama | |
| 2013/0328810 | A1 | 12/2013 | Li et al. | |
| 2014/0035886 | A1* | 2/2014 | Idzik | G06F 3/01 345/179 |
| 2014/0218343 | A1* | 8/2014 | Hicks | G06F 3/033 345/179 |

OTHER PUBLICATIONS

Byzero, "Studio Digital Pen and App," pp. 1-16, Retrieved from the Internet: URL: http://www.blessthisstuff.com/stuff/technology/portable-media/byzero-studio-digital-pen-and-app [retrieved on Dec. 5, 2016].

Etherington D., "The Hex3 JaJa Stylus: A Pressure-Sensitive iPad Drawing Tool That Uses Sound to Paint a Picture," 2012, pp. 1-5, Retrieved from the Internet: URL: https://techcrunch.com/2012/10/26/review-hex3-jaja-stylus-ipad-pressure-sensitive/ [retrieved on Dec. 5, 2016].

Luidia Inc., "eBeam Edge. Make any flat surface interactive in minutes," pp. 1-3, Retrieved from the Internet: URL: http://www.e-beam.com/business/ebeam-edge/overview.html [retrieved on Dec. 5, 2016].

PC, "HEX3 JaJa Pressure Sensitive Stylus," pp. 1-30, Retrieved from the Internet: URL: http://www.pcmag.com/article2/0,2817,2411194,00.asp [retrieved on Dec. 5, 2016].

PNF, "Smart pen," pp. 1-4, Retrieved from the Internet: URL: http://www.penandfree.co.kr/en/product_smartpen.html [retrieved on Dec. 5, 2016].

Schulman J., "Wacom Inkling review," Nov. 28, 2011. pp. 1-12, Retrieved from the Internet: URL: http://www.theverge.com/2011/11/28/2586419/wacom-inkling-review [retrieved on Dec. 5, 2016].

Yifang Digital, "Smart Pen for iPad," pp. 1-8, Retrieved from the Internet: URL:http://www.yifangdigital.com/product/mobilepen.aspx [retrieved on Dec. 5, 2016].

* cited by examiner

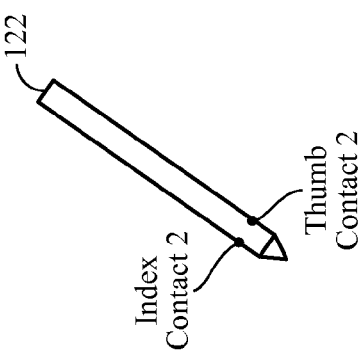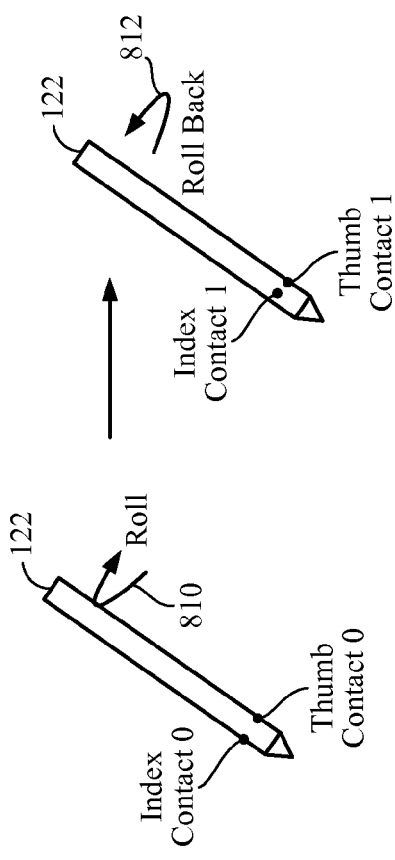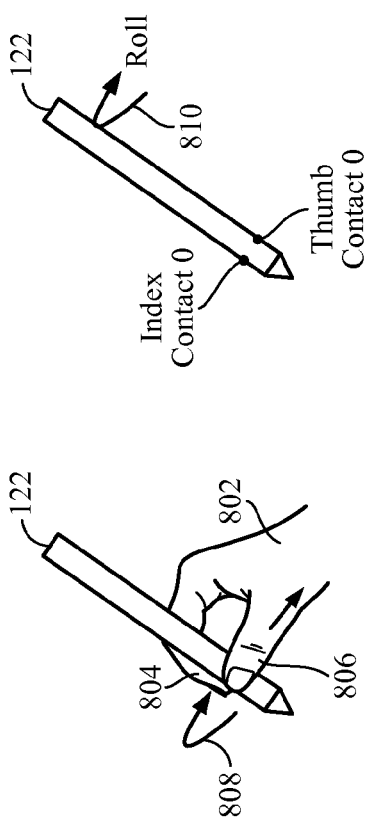

IN-AIR ULTRASOUND PEN GESTURES

CROSS-REFERENCE TO RELATED APPLICATIONS

The present application for patent claims priority to Provisional Application No. 61/943,261 entitled IN-AIR ULTRASOUND PEN GESTURES, filed Feb. 21, 2014, by the same inventors as the subject application, assigned to the assignee hereof and hereby expressly incorporated by reference herein in its entirety.

BACKGROUND

Field of Disclosure

The technology described herein is directed to pen-based systems, and in particular, to ultrasound pen gesture detection.

Background

Many computer systems, especially computer systems using graphical user interfaces (GUIs), are optimized for accepting user input from one or more discrete input devices. A keyboard may be used for entering text. A pointing device, such as a mouse, may also be used for operating the user interface. The keyboard and mouse interfaces provide for fast creation and modification of documents, spreadsheets, database fields, drawings, photos, and the like.

Recently, however, pen-based computing systems, such as tablet personal computers (PCs), personal digital assistants (PDAs), and the like, have been increasing in popularity. In pen-based computing systems, user input may be introduced using an electronic "pen" or stylus (e.g., akin to writing with a conventional pen or pencil on a piece of paper). There is still room for improvement to pen-based systems, however

SUMMARY

An implementation of the technology described herein is directed to a method of detecting gesture commands using an ultrasonic pen and a user device, comprising: acquiring a position of the ultrasonic pen along an x-axis of the user device; acquiring a position of the ultrasonic pen along a y-axis of the user device; acquiring a position of the ultrasonic pen along a z-axis of the user device; and performing a command based on the acquired positions.

Another implementation is directed to an apparatus for detecting gesture commands using an ultrasonic pen and a user device, comprising: a microphone array configured to acquire a position of the ultrasonic pen along an x-axis of the user device, along a y-axis of the user device, and along a z-axis of the user device; and a command execution module configured to perform a command based on the acquired the positions.

Another implementation is directed to an apparatus for detecting gesture commands using an ultrasonic pen and a user device, comprising: means for acquiring a position of the ultrasonic pen along an x-axis of the user device, along a y-axis of the user device, and along a z-axis of the user device; and means for performing a command based on the acquired positions.

Another implementation is directed to a computer-readable storage medium including information that, when accessed by a machine, cause the machine to perform operations for detecting gesture commands using an ultrasonic pen and a user device, the operations comprising: acquiring a position of the ultrasonic pen along an x-axis of the user device; acquiring a position of the ultrasonic pen along a y-axis of the user device; acquiring a position of the ultrasonic pen along a z-axis of the user device; and performing a command based on the acquired positions.

Above is a simplified Summary relating to one or more implementations described herein. As such, the Summary should not be considered an extensive overview relating to all contemplated aspects and/or implementations, nor should the Summary be regarded to identify key or critical elements relating to all contemplated aspects and/or implementations or to delineate the scope associated with any particular aspect and/or implementation. Accordingly, the Summary has the sole purpose of presenting certain concepts relating to one or more aspects and/or implementations relating to the mechanisms disclosed herein in a simplified form to precede the detailed description presented below.

BRIEF DESCRIPTION OF THE DRAWINGS

FIGS. 8A though 8D illustrate a micro-twist gesture for a pen according to one or more implementations of the technology herein.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

In general, example implementations of the technology described herein are directed to detecting in-air gesture commands using an ultrasonic pen system. An in-air gesture is defined herein as a movement made by a user of a pen that is near, but not in contact with, a display screen of a user device. The user device allows pen and/or stylus input to control functionalities of the user device. Inputs may be (1) two dimensional (2D) in-air gestures, (2) three dimensional (3D) in-air gestures, (3) rolling in-air gestures, (4) twisting in-air gestures, (5) micro-twisting in-air gestures, and the like. The in-air gestures are detected and interpreted by the user device to control functionalities such as volume control, screen scrolling, zooming, etc.

Figure 1:
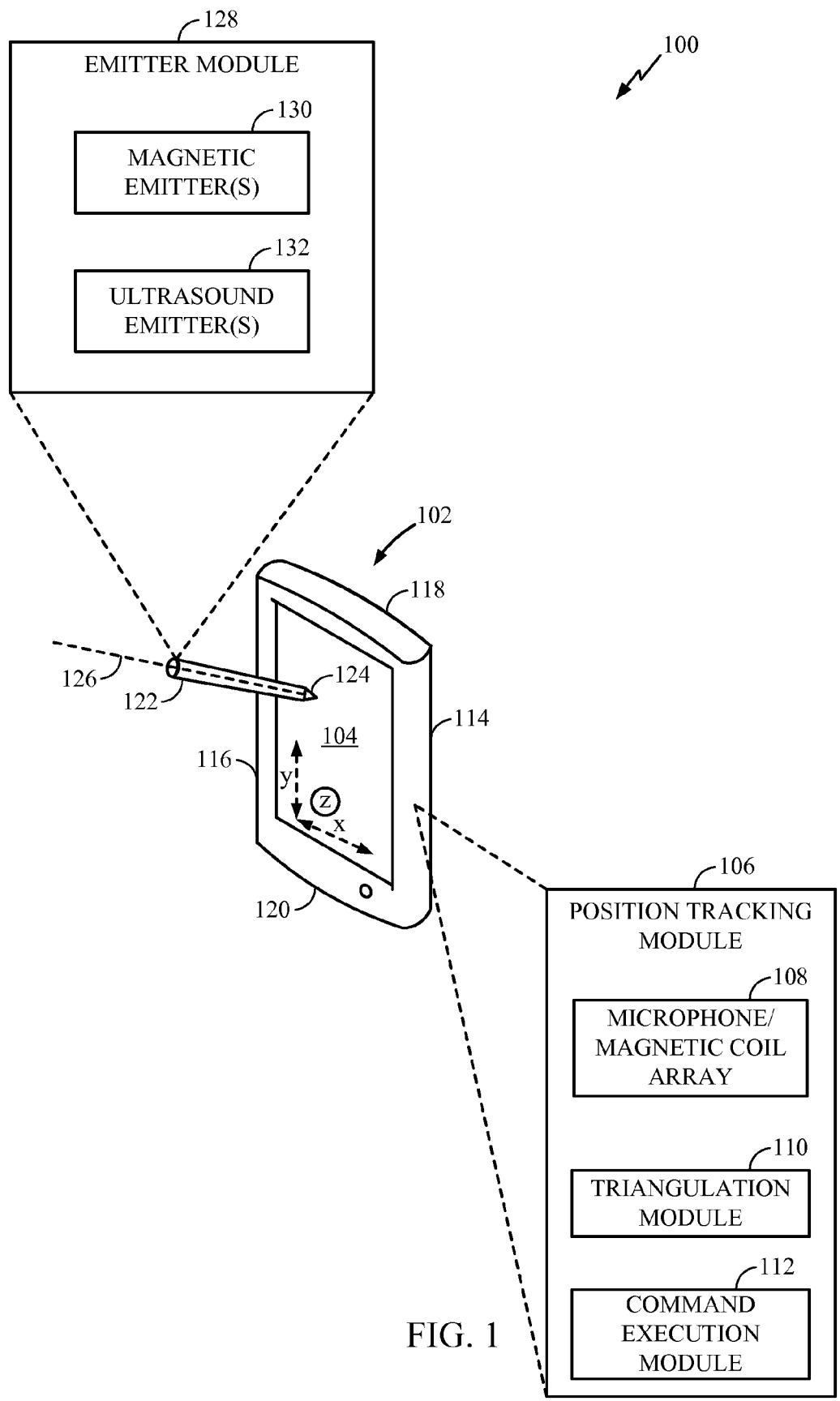
FIG. 1 depicts an in-air pen gesture system according to an example implementation of the technology described herein.

FIG. 1 depicts an in-air pen gesture system 100 according to an example implementation of the technology described herein. The illustrated system 100 includes a user device 102. The user device 102 includes a screen 104 and a position tracking module 106. The position tracking module 106 includes a microphone/magnetic coil array module 108, a triangulation module 110, and a command execution module 112. The user device 102 also includes a right side 114, a left side 116, a top side 1118, and a bottom side 114.

The illustrated system 100 includes a pen 122. The pen 122 includes a tip 124 and a longitudinal axis 126. The pen 122 includes an emitter module 128 disposed along the longitudinal axis 126. The emitter module 128 includes several magnetic emitters 130 and several ultrasound emitters 132. The emitter module 128 is disposed along the longitudinal axis 126 of the pen 122.

In one or more implementations, the user device 102 may be any user device and/or equipment such as a telephone, a tablet computer, a smartphone, a phablet, a laptop or desktop computer, a vehicle entertainment system, or the like. The user device 102 may be capable of receiving energy in the form of sound waves, magnetic waves, or the like.

In one or more implementations, the screen 104 may be any suitable display screen that enables a user to interact with the user device 102. For example, the screen 104 may have navigational mechanisms, a keyboard, icons, or other suitable display screen items. The screen 104 also may be touch-sensitive, pressure-sensitive, electrically sensitive, acoustically sensitive, photo-sensitive, or the like.

In one or more implementations, the position tracking module 106 includes any suitable hardware, software, firmware, or combination thereof that is capable of calculating distances traveled by energy transmitted from the pen 122 to the screen 104.

In one or more implementations, the microphone/magnetic coil array module 108 may include any suitable transducers, magnetic coils, and/or sensors that are capable of receiving electromagnetic energy and/or sound waves transmitted from the pen 122 to the user device 102 and converting the received energy to a signal usable by the position tracking module 106.

In one or more implementations, the triangulation module 110 includes any suitable hardware, software, firmware, or combination thereof that is capable of applying a triangulation algorithm to energy received at the user device 102 to determine where the pen 122 is positioned relative to the screen 104 (e.g., the x-y-z coordinates of the pen 122 relative to the screen 104).

In one or more implementations, the command execution module 112 may be implemented using any suitable software development kit (SDK) that can follow movements of the pen 122 and expose the system 100 to predetermined set(s) of gestures that are tracked and/or detected by the user device 102. The command execution module 112 is described in greater detail below.

In one or more implementations, the pen 122 may be any suitable pen, stylus, or the like that is capable of interacting with the user device 102 in accordance with the technology disclosed herein. Although illustrated as having magnetic emitters 130 and ultrasound emitters 132, other mechanisms such as accelerometers and the like may be used.

In one or more implementations, the tip 124 may be any suitable material such as rubber, microfiber, metal, etc. The tip 124 is disposed at one end of the pen 122 along the longitudinal axis 126 as illustrated.

The illustrated emitter module 128 is shown as having several magnetic emitters 130 and several ultrasound emitters 132. However, in other implementations the emitter module 128 may include other suitable energy emitters (e.g., electromagnetic energy emitters).

In one or more implementations, the magnetic emitters 130 may be any suitable devices that produce a known magnetic field direction and strength. In one example, the magnetic emitters 130 may be open transformers. In one implementation, individual magnetic emitters in the magnetic emitters 130 are aligned with each other along the longitudinal axis 126 of the pen 122.

In one or more implementations, the ultrasound emitters 132 may include any suitable transducers that are capable of receiving an electrical signal, converting that electrical signal to energy (e.g., an ultrasound wave), and transmitting the energy from the pen 122 to the user device 102. Individual ultrasound emitters in the ultrasound emitters 132 are aligned with each other along the longitudinal axis 126 of the pen 122.

In one or more implementations, the system 100 is capable of determining the positions of the pen 122 along the x-axis, y-axis, and/or z-axis of the user device 102. In one implementation, the system 100 may determine the positions of the pen 122 along the x-axis, y-axis, and/or z-axis of the user device 102 as follows.

As a user moves the pen 122 along the x-axis of the screen 104, y-axis of the screen 104, and/or z-axis of the screen 104, the ultrasound emitters 132 generate ultrasound signals. Microphones in the microphone/magnetic coil array 108 receive the ultrasound signals and couple the ultrasound signals to the triangulation module 110. The triangulation module 110 applies any known triangulation algorithm to the received ultrasound signals to determine where the pen 122 is positioned relative to the x-axis, y-axis, and/or z-axis of the screen 104.

The position tracking module 106 calculates a distance traveled by the ultrasonic signals from the tip 124 to the screen 104 based on the time of flight of the ultrasound signals from the tip 124 to the microphones in the microphone/magnetic coil array 108. The distance traveled by the ultrasonic signals may be calculated using any known time-of-arrival (ToA) algorithm or differential time-of-arrival (ToA) algorithm.

The user device 102, having the position of the pen 122 relative to the x-axis, y-axis, and/or z-axis of the screen 104 and the distance traveled by the ultrasonic signals, is thereby able to identify the positions of the pen 122 along the x-axis, y-axis, and/or z-axis of the user device 102.

In one or more implementations, the system 100 also is capable of detecting rolling and/or twisting gestures about the longitudinal axis 126 of the pen 122. In one implementation, the system 100 detects rolling and/or twisting gestures of the pen 122 about the longitudinal axis 126 as follows.

As a user rolls or twists the pen 122 a certain number of degrees, i.e., one-quarter turn, ninety degrees, one-hundred eighty degrees, three-hundred sixty degrees, etc., in a deliberate fashion about the longitudinal axis 126 of the pen 122, the magnetic emitters 130 in the pen 122 produce a known magnetic field direction and strength. Two or more magnetic fields produced by the magnetic emitters 130 interact with the magnetic fields produced and tracked by magnetic coils in the microphone/magnetic coil array 108 on the user device 102. As a user rotates (e.g., rolls or twists the pen 122) the shape/phase of magnetic fields received at the user device 102 deforms. The magnetic coils in the microphone/magnetic coil array 108 detect the deformation of the different magnetic fields. Detection of the deformation of the magnetic fields allows the system 100 to determine the orientation of the pen 122's body about the longitudinal axis 126.

Alternatively, an accelerometer may be used to detect rolling and/or twisting of the pen 122 and/or the orientation of the body of the pen 122 about the longitudinal axis 126. The accelerometer may be located in the pen 122 body. The pen 122 is capable of transmitting the signal from the accelerometer to the user device 102 using ultrasound signals or any other suitable communication means such as Bluetooth, Bluetooth Low Energy (BTLE), or the like.

In one or more implementations, the system 100 also is capable of detecting micro-twisting gestures of the pen 122 about the longitudinal axis 126. A micro-twisting gesture involves a short rolling movement in one direction followed by a quick rolling movement in the opposite direction.

Variables could include the speed of the micro-twists, quickness in changing direction, duration of micro-twists, position of the pen 122 in air, tilt angle of the pen 122 in relation to the screen 104 during micro-twist, and the presence of rapid thumb and finger movements over short rotational distances of the pen 122, for example.

A short rotational distance may be approximately one degree to ten degrees. Another short rotational distance may be approximately eleven degrees to approximately one quarter turn. Of course, differentiation between the rotational angles and/or distances for the rolling gestures and the twisting gestures of the pen 122 about the longitudinal axis 126 may be determined based on design tradeoffs.

In one implementation, the system 100 detects micro-twisting gestures of the pen 122 about the longitudinal axis 126 as follows. As a user micro-twists the pen 122, the magnetic emitters 130 in the pen 122 produce a known magnetic field direction and strength commensurate with the micro-twist. Two or more magnetic fields produced by the magnetic emitters 130 interact with the magnetic fields produced and tracked by magnetic coils in the microphone/magnetic coil array 108 on the user device 102. As a user micro-twists the pen 122 about the longitudinal axis 126, the shape/phase of magnetic fields received at the user device 102 deforms. The magnetic coils in the microphone/magnetic coil array 108 detect the deformation of the different magnetic fields. Detection of the deformation of the magnetic fields allows the system 100 to determine the micro-twisting of the pen 122's body about the longitudinal axis 126.

While the implementations of the technology disclosed herein have been described with respect to the system 100 being able to detect gestures of the pen 122 made facing the screen 104, the system 100 is capable of detecting gestures made on the periphery of the user device 102. For example, the pen 122 can be placed on the right side 114, the left side 116, the top side 118, or the bottom side 120 of the pen 122 and the user device 102 is still capable of detecting the ultrasound and/or magnetic signals from the pen 122 when the pen is placed near the right side 114, the left side 116, the top side 118, or the bottom side 120 of the pen 122.

In one implementation, the system 100 may determine the gestures of the pen 122 near the right side 114 of the user device 102 as follows. As a user moves the pen 122 near the right side 114 of the user device 102, the ultrasound emitters 132 generate ultrasound signals. Microphones in the microphone/magnetic coil array 108 receive the ultrasound signals and couple the ultrasound signals to the triangulation module 110, which a triangulation algorithm to the received ultrasound signals to determine where the pen 122 is positioned relative to the right side 114 of the user device 102.

The position tracking module 106 calculates a distance traveled by the ultrasonic signals from the tip 124 to the screen 104 based on the time of flight of the ultrasound signals from the tip 124 to the microphones in the microphone/magnetic coil array 108. The distance traveled by the ultrasonic signals may be calculated using any known time-of-arrival (ToA) algorithm or differential time-of-arrival (ToA) algorithm.

The user device 102, having the position of the pen 122 relative to the right side 114 of the user device 102 and the distance traveled by the ultrasonic signals, is thereby able to identify the positions of the pen 122 relative to the right side 114 of the user device 102.

The system 100 may determine the gestures of the pen 122 near the left side 116 of the user device 102, the top side 118 of the user device 102, and the bottom side of the user device 102 in a manner similar to determining the gestures of the pen 122 near the right side 114 of the user device 102.

The system 100 also is able to detect tilt angles of the pen 122. For example, the system 100 includes a tilt detection mechanism to determine an angle of the pen 122 in relation to the screen 104. Because the ultrasound pen technology described herein tracks z-axis positioning in relation to the screen 104 and tilt in relation to the screen 104, a "laser pointer" type interaction, or a "mouse" type interaction can be enabled. The different interaction methods may have a slightly different effect on how the user would enter x-y gestures, however. For example, in a mouse-type interaction, the user may not be concerned with the tilt angle of the pen 106 and may only match the tip 124's absolute x-y position with the gesture path. In a laser pointer-type interaction, the user may be able to essentially "draw" a gesture path with a cursor that appears on the screen 104.

By enabling tilt sensing the system 100, rather than tracking the tip 124 position along only the x-y coordinates of the screen 104 similar to mouse movements, the pen 122 can point along the x-y-z coordinates of the screen 104. Tilt sensing may be beneficial because it gives users a mechanism for manipulating the screen 104 with minimal movement of the hand and/or pen 122 body.

As an example, the further away from the screen 104 the pen 122 along the z-axis, as long as the pen 122 is still within a predetermined range, the less amount of pen 122 movement may be needed for an equal amount of on-screen cursor movement. For instance, if the pen 122 is one foot away from the screen 104 surface and moves one centimeter up in the y-direction, this may translate to a ten centimeter cursor move along the y-axis on the screen 104. Contrast this with the pen 122 being ten feet away from the screen 104 and moving one centimeter up in the y-direction. This may translate to a one hundred centimeter cursor move along the y-axis on the screen 104.

In one or more implementations, once the user device 102 (e.g., position tracking module 106) has acquired the positions of the ultrasonic pen 122 along the x-axis, y-axis, and z-axis of the user device 102, acquired positions along the periphery of the user device 102, and/or detected rolling, twisting, and/or micro-twisting gestures, the user device 102 may perform commands based on those acquired positions. In one or more implementations, gesture commands may be implemented using the command execution module 112. For instance, using the software development kit (SDK) of the command execution module 112 an event may be created indicating that a particular gesture has been detected. The associated application and/or operating system of the user device 102 may then translate the event into the particular user interface command.

As an example, suppose that a user is drawing an intricate drawing and it has become a little bit difficult for the user to erase the exact line that the user just made. Typically, a user device includes an UNDO button on the graphical user interface (GUI) of its screen. The user would manually select the UNDO button to erase the unwanted line. Using the technology described herein, instead of having to touch the UNDO button, the user can twist the pen 122 quickly (or micro-twist the pen 122) to enable the UNDO command of the system 100. The user does not have to have the pen 122 in direct physical contact with the user device 102 in order to erase the unwanted line.

In an alternative example, suppose a user is browsing the Internet with the system 100 in their lap. Typically, a user device includes a BACK button on the graphical user interface (GUI) of its screen. The user would manually select the BACK button to go from the current page back to a previous page. Using the technology described herein, instead of having to touch the BACK button, the user can twist the pen 122 quickly to enable the BACK command of the system 100. The user does not have to have the pen 122 in direct physical contact with the user device 102 in order to cause the screen 104 to return to the previous page.

In another example, suppose that a user wishes to turn pages on a screen. Typically, the user would swipe either a fingertip or a pen tip along the surface of the screen to turn the page. Using the technology described herein, instead of having to touch the screen 104, the user can twist the pen 122 quickly to enable a PAGE TURN command of the system 100. The user does not have to have the pen 122 in direct physical contact with the user device 102 in order to cause the page to turn.

Figure 2:
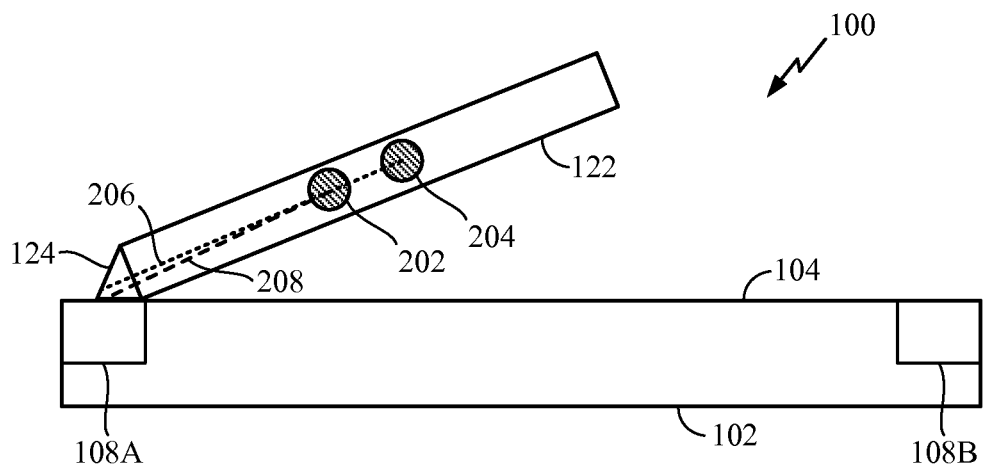
FIG. 2 is a side view of an in-air pen gesture system illustrating two-dimensional (2D) and/or x-y position orientation on a user device for detecting a position of a pen tip according to an example implementation of the technology described herein.

FIG. 2 is a side view of the system 100 illustrating two microphones/magnetic coils 108A and 108B on the screen 104 of the user device 102. The pen 122 has an emitter 202 and an emitter 204. The pen 122 has its tip 124 positioned at a location in contact with the microphone/magnetic coil 108A.

A line 206 represents a distance and/or time it takes for the ultrasound and/or magnetic signal from the emitter 202 to reach the microphone/magnetic coil 108A. A line 208 represents a distance and/or time it takes for the ultrasound and/or magnetic signal from the emitter 204 to reach the microphone/magnetic coil 108B. Note that the distance and/or time it takes for the ultrasound and/or magnetic signal from the emitter 202 to reach the microphone/magnetic coil 108A is less than the distance and/or time it takes for the ultrasound and/or magnetic signal from the emitter 204 to reach the microphone/magnetic coil 108A.

The system 100 can determine the location, position, and tilt angle of the tip 124 with respect to the user device 102 using the difference between the distance and/or time it takes for the ultrasound and/or magnetic signal from the emitter 202 to reach the microphone/magnetic coil 108A along the line 206 and the distance and/or time it takes for the ultrasound and/or magnetic signal from the emitter 204 to reach the microphone/magnetic coil 108A along the line 208. The position tracking module 106 may determine the location, position, and tilt angle of the tip 124 with respect to the user device 102 and calculate the distance/time it takes for the ultrasound and/or magnetic signal from the emitter 204 to reach the microphone/magnetic coil 108A along the line 208 as described above.

Note that the microphones/magnetic coils 108A and 108B may be located not just near the tip 124 but substantially anywhere on the pen 122 body. Additionally, although not shown as such, the pen 122 can have its tip 124 positioned at a location that is not in contact with the microphone/magnetic coil 108A and the position tracking module 106 can determine the location, position, and tilt angle of the tip 124 with respect to the user device 102 using the difference between the distance and/or time it takes for the ultrasound and/or magnetic signal from the emitter 202 to reach the microphone/magnetic coil 108A and the distance and/or time it takes for the ultrasound and/or magnetic signal from the emitter 204 to reach the microphone/magnetic coil 108A.

Figure 3:
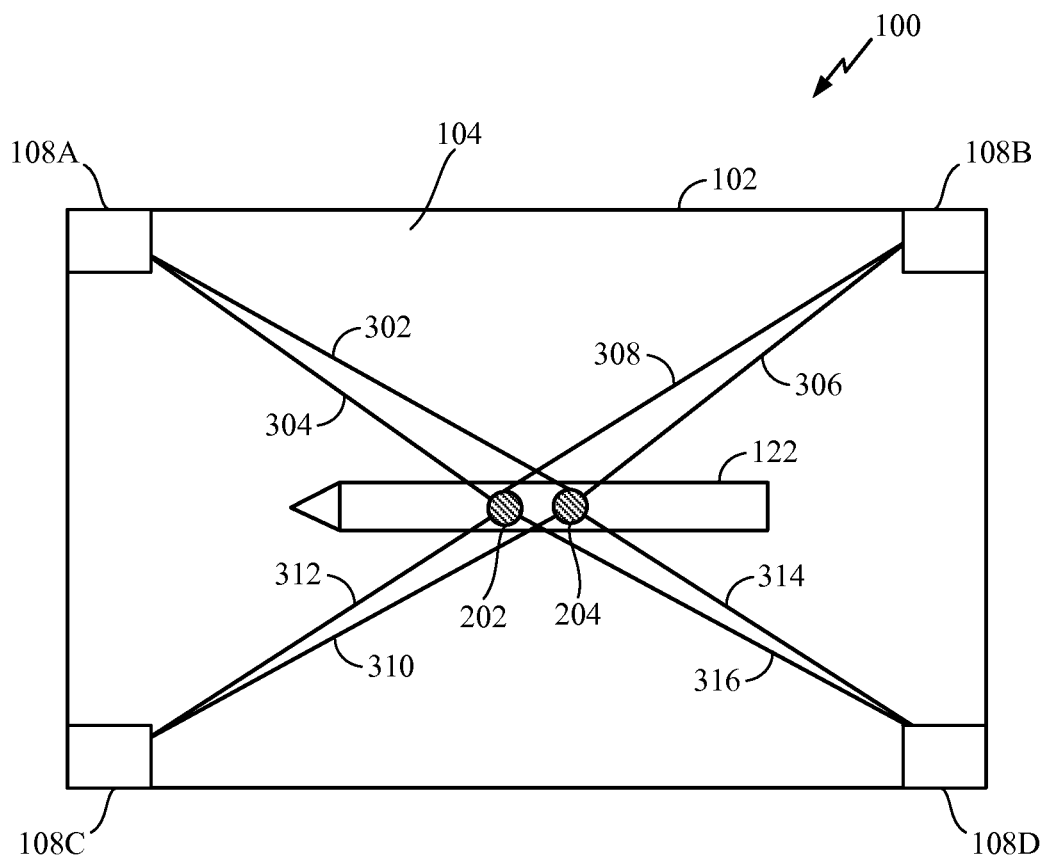
FIG. 3 is a top view of the in-air pen gesture system depicted in FIG. 1 illustrating two-dimensional (2D) and/or x-y position orientation on a user device according to an example implementation of the technology described herein.

FIG. 3 is a top view of the system 100 illustrating four microphones/magnetic coils 108A, 108B, 108C, and 108D on the screen 104 of the user device 102. The pen 122 includes the emitter 202 and the emitter 204. The pen 122 is positioned above the screen 104 of the user device 102 at a location near the center of the screen 104.

A line 302 represents a distance and/or time it takes for the ultrasound and/or magnetic signal from the emitter 202 to reach the microphone/magnetic coil 108A. A line 304 represents a distance and/or time it takes for the ultrasound and/or magnetic signal from the emitter 204 to reach the microphone/magnetic coil 108A.

A line 306 represents a distance and/or time it takes for the ultrasound and/or magnetic signal from the emitter 202 to reach the microphone/magnetic coil 108B. A line 308 represents a distance and/or time it takes for the ultrasound and/or magnetic signal from the emitter 204 to reach the microphone/magnetic coil 108B.

A line 310 represents a distance and/or time it takes for the ultrasound and/or magnetic signal from the emitter 202 to reach the microphone/magnetic coil 108C. A line 312 represents a distance and/or time it takes for the ultrasound and/or magnetic signal from the emitter 204 to reach the microphone/magnetic coil 108C.

A line 314 represents a distance and/or time it takes for the ultrasound and/or magnetic signal from the emitter 202 to reach the microphone/magnetic coil 108D. A line 316 represents a distance and/or time it takes for the ultrasound and/or magnetic signal from the emitter 204 to reach the microphone/magnetic coil 108D.

Note that the distance and/or time it takes for the ultrasound and/or magnetic signal from the emitter 202 to reach the microphone/magnetic coil 108A along the line 302 is less than the distance and/or time it takes for the ultrasound and/or magnetic signal from the emitter 204 to reach the microphone/magnetic coil 108A along the line 304. Similarly, the distance and/or time it takes for the ultrasound and/or magnetic signal from the emitter 202 to reach the microphone/magnetic coil 108B along the line 306 is less than the distance and/or time it takes for the ultrasound and/or magnetic signal from the emitter 204 to reach the microphone/magnetic coil 108B along the line 308.

Likewise, the distance and/or time it takes for the ultrasound and/or magnetic signal from the emitter 202 to reach the microphone/magnetic coil 108C along the line 310 is less than the distance and/or time it takes for the ultrasound and/or magnetic signal from the emitter 204 to reach the microphone/magnetic coil 108C along the line 312. Additionally, the distance and/or time it takes for the ultrasound and/or magnetic signal from the emitter 202 to reach the microphone/magnetic coil 108D along the line 314 is less than the distance and/or time it takes for the ultrasound and/or magnetic signal from the emitter 204 to reach the microphone/magnetic coil 108D along the line 316.

In the manner described above, the position tracking module 106 can determine the location, position, and tilt angle of the tip 124 with respect to the user device 102 using the difference between the distance and/or time it takes for the ultrasound and/or magnetic signal from the emitter 202 to reach the microphones/magnetic coils 108A, 108B, 108C, and 108D and the distance and/or time it takes for the ultrasound and/or magnetic signal from the emitter 204 to reach the microphones/magnetic coils 108A, 108B, 108C, and 108D.

Figure 4A:
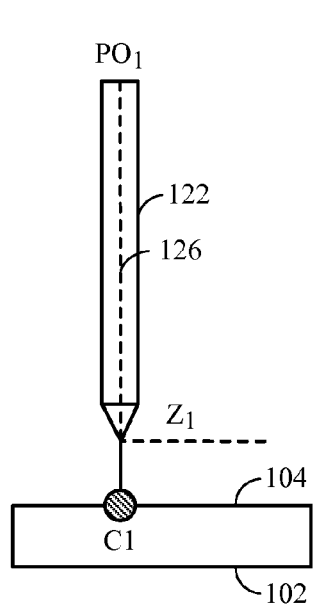
FIG. 4A is a side view of the in-air pen gesture system depicted in FIG. 1 illustrating two-dimensional (2D) and/or x-y position orientation on the user device according to an example implementation of the technology described herein.

FIG. 4A is a side view of the system 100 illustrating pen 122 position orientation on the user device 102 according to an example implementation of the technology described herein. In the illustrated implementation, the pen 122 has a pen orientation $PO_1$ relative to the screen 104. The pen 122 at pen orientation $PO_1$ has a height $Z_1$ relative to the screen 104. The pen 122 at pen orientation $PO_1$ is pointing to a cursor location C1 and on the screen 104. The cursor C1 defines a position along the x-y axes on the screen 104. The height $Z_1$ defines a position relative to the z-axis the screen 104.

The user device 102 may interpret the pen 122's position at the orientation $PO_1$, the height $Z_1$, and the cursor location C1 as a particular command. For example, the command may be interpreted as MOVE ONE LINE UP on a page on the screen 104. Alternatively, the command may be interpreted as ZOOM IN on a page on the screen 104. Alternatively still, the command may be interpreted as INCREASE MEDIA VOLUME of music, a game, a video playing on the user device 102.

Figure 4B:
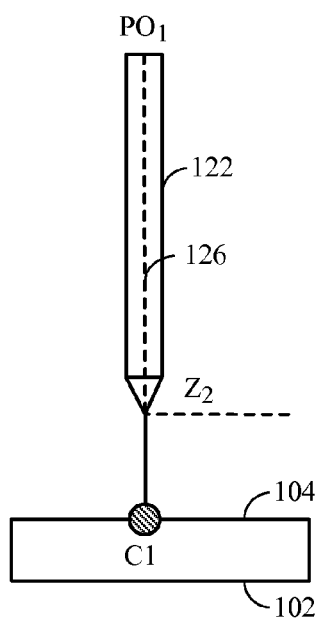
FIG. 4B is a side view of the in-air pen gesture system depicted in FIG. 1 illustrating two-dimensional (2D) and/or x-y position orientation on the user device according to an alternative implementation of the technology described herein.

If the pen 122's position relative to the screen 104 changes, the user device 102 may interpret the position as a different command. For example, FIG. 4B is a side view of the system 100 illustrating pen 122 position orientation on the user device 102 according to an alternative example implementation of the technology described herein. In the illustrated implementation, the pen 122 still has a pen orientation $PO_1$ relative to the screen 104. The pen 122 at pen orientation $PO_1$ is still pointing to a cursor location C1 and on the screen 104. However, the pen 122 at pen orientation $PO_1$ has different height, a height $Z_2$, relative to the screen 104.

Rather than interpreting the orientation of the pen 122 in FIG. 4B as the command MOVE ONE LINE UP on a page on the screen 104, the user device may interpret the orientation of the pen 122 in FIG. 4B as the command SCROLL TEN PAGES on the screen 104. Alternatively, the command may be interpreted as ZOOM OUT on a page on the screen 104. Alternatively still, the command may be interpreted as INCREASE SYSTEM VOLUME of the user device 102.

Figure 4C:
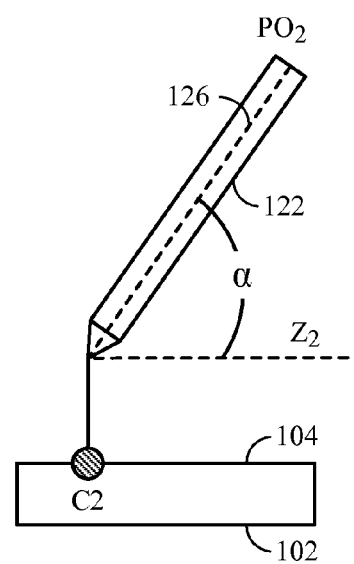
FIG. 4C is a side view of the in-air pen gesture system depicted in FIG. 1 illustrating two-dimensional (2D) and/or x-y position orientation on the user device according to another implementation of the technology described herein.

FIG. 4C is a side view of the system 100 illustrating pen 122 position orientation on the user device 102 according to still another example implementation of the technology described herein. In the example illustrated in FIG. 4C, the pen 122 still has the height $Z_2$. However, the pen 122 has a different pen orientation, $PO_2$, which produces a tilt angle α relative to the screen 104. The pen 122 also is pointing to a different cursor location C2 and on the screen 104.

Moving the pen 122 also from the cursor location C1 to the cursor location C2 may also be interpreted as a command. For example, moving the pen 122 also from the cursor location C1 to the cursor location C2 may be interpreted as GO TO THE NEXT PAGE on the screen 104. In contrast, moving the pen 122 also from the cursor location C2 to the cursor location C1 may be interpreted as GO TO THE PREVIOUS PAGE on the screen 104. Orienting the pen 122 at the tilt angle α in combination with the cursor location C2 and the height $Z_2$ may also be interpreted as a different command.

Figure 5:
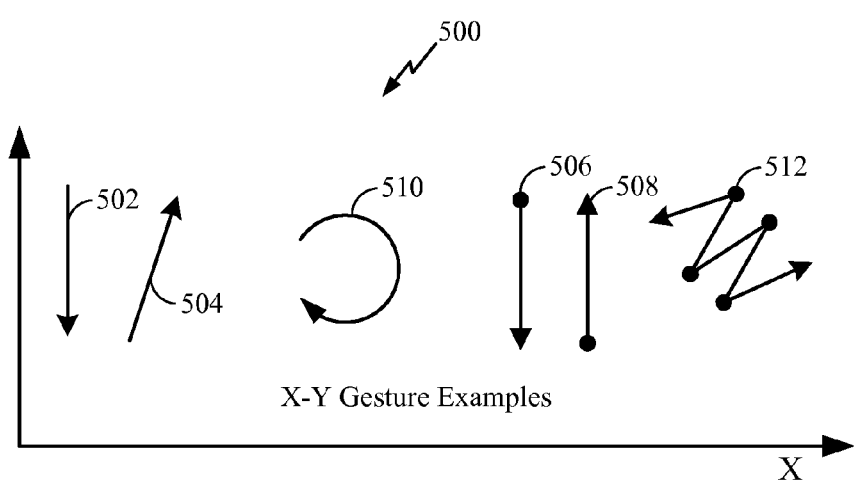
FIG. 5 illustrates several examples of two-dimensional (2D) and/or x-y position orientation on a user device according to an example implementation of the technology described herein.

FIG. 5 is a graphical representation 500 illustrating example of pen 122 gestures relative to the user device 102 according to implementations of the technology described herein. The pen 122 gestures 502, 504, 506, and 508 are single linear gestures. As used herein, a linear gesture is any single movement in a direction.

In the illustrated implementation, a gesture 510 is a curved gesture. As used herein, a curved gesture may be any gesture that appears in the form of a circle. However, the gesture 510 may be only a portion of a curve.

In the illustrated implementation, a gesture 512 may be a combination of gestures, such as a linear gesture combined with a curve gesture. The gesture 512 is an example of a linear combination resulting in a series of back and forth linear movements. This gesture may be used to implement an ERASE or UNDO command.

Alternatively, a combination gesture may be used to accelerate scrolling on the screen 110. This may be implemented using an up and down movement of the pen 122.

Other curve combination examples may include a series of circular pen 122 gestures to implement a REFRESH ALL command, as well as a sinusoidal gesture, which may be used to implement a SWITCH-TO-PEN TOOL, SWITCH-TO-BRUSH TOOL, and the like, commands.

Figure 6:
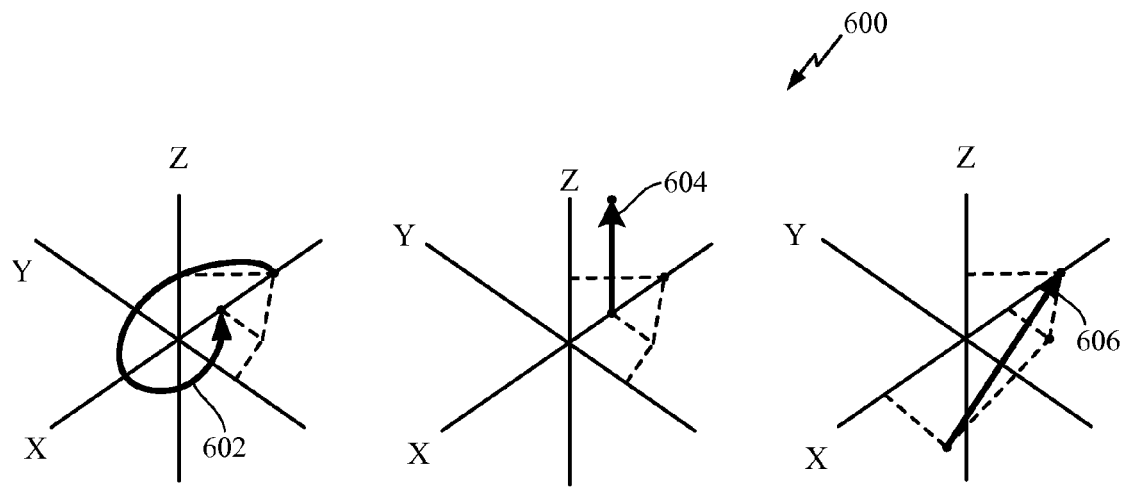
FIG. 6 illustrates graphical representations of several examples of three-dimensional (3D) and/or x-y-z position orientation on a user device according to implementations of the technology described herein.

FIG. 6 is a graphical representation 600 of several examples of three-dimensional (3D) position orientation according to implementations of the technology described herein. A three-dimensional gesture 602 includes a path that resembles a corkscrew. This gesture may be used to invoke a command to DIG DEEPER INTO A FOLDER HIERARCHY on the user device 102, for example.

A one-dimensional gesture 604 includes moving the pen 122 straight up or down. This gesture may be used to invoke a command to ZOOM into or SELECT a particular object on the screen 104.

A 2-dimensional gesture 606 includes moving the pen 122 in non-straight angle (as 604). This gesture may be used to invoke a command to change the users point of view were "z" axis encodes distance from the object, and side movement encodes position of the camera or point of view.

Figure 7:
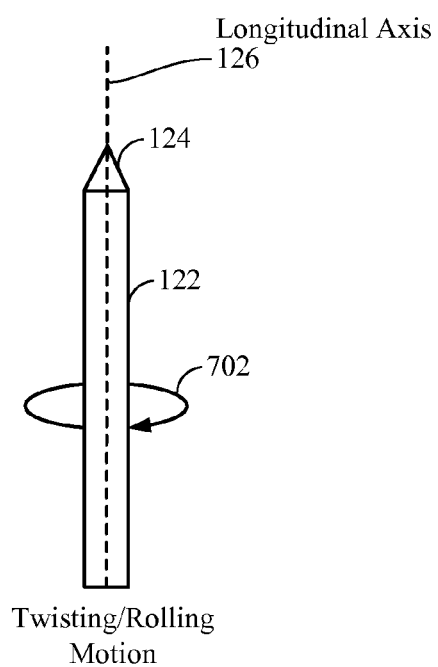
FIG. 7 illustrates a pen undergoing a rolling/twisting in-air gesture and a pen orientation gesture according to an implementation of the technology described herein.

FIG. 7 illustrates the pen 122 undergoing a rolling/twisting in-air gesture and a pen orientation gesture according to an implementation of the technology described herein. In the illustrated implementation, the pen 122 is rolled and/or twisted in a direction represented by an arrow 702. The pen 122 is rolled and/or twisted about a longitudinal axis 126 of the pen 122. The user may roll or twist the pen 122 a certain number of degrees, i.e., one-quarter turn, ninety degrees, one-hundred eighty degrees, three-hundred sixty degrees, etc., in a deliberate fashion to successfully input an associated command.

FIGS. 8A though 8D illustrate a micro-twist gesture for the pen 122 according to one or more implementations of the technology herein. The micro-twist gesture involves a short rolling movement in one direction followed by a quick rolling movement in the opposite direction. Variables could include the speed of the twists, quickness in changing direction, duration of twists, position of the pen 122 in air, tilt angle in relation to the screen 104 during twist, and the presence of rapid thumb and finger movements, for example.

A micro-twist gesture may be defined by three major stages. The first stage, shown in FIGS. 8A and 8B, is the initial twist or rolling movement (i.e., to the right or left) by the user's hand 802. The user's index finger 804 is located on the index contact 0 and the user's thumb 806 is located on a thumb contact 0. The direction of the movement of the pen 122 is along the arrow 808.

The second stage is an abrupt stop and change in direction. This is shown in FIG. 8C, in which the user's index finger 804 has moved from the index contact 0 to the index contact 1 and the user's thumb 806 has moved from thumb contact 0 to thumb contact 1. The direction of the movement of the pen 122 is along the arrow 810.

The third stage is a twist back in the opposite direction close to the pen 122's orientation at the start of the initial twist. This is shown in FIG. 8D, in which the user's index finger 804 has moved to the index contact 2 and the user's thumb 806 has moved to the thumb contact 2, which approximates the original index finger 804 location on the index contact 0 and the original user's thumb 806 location on the thumb contact 0.

Figure 9:
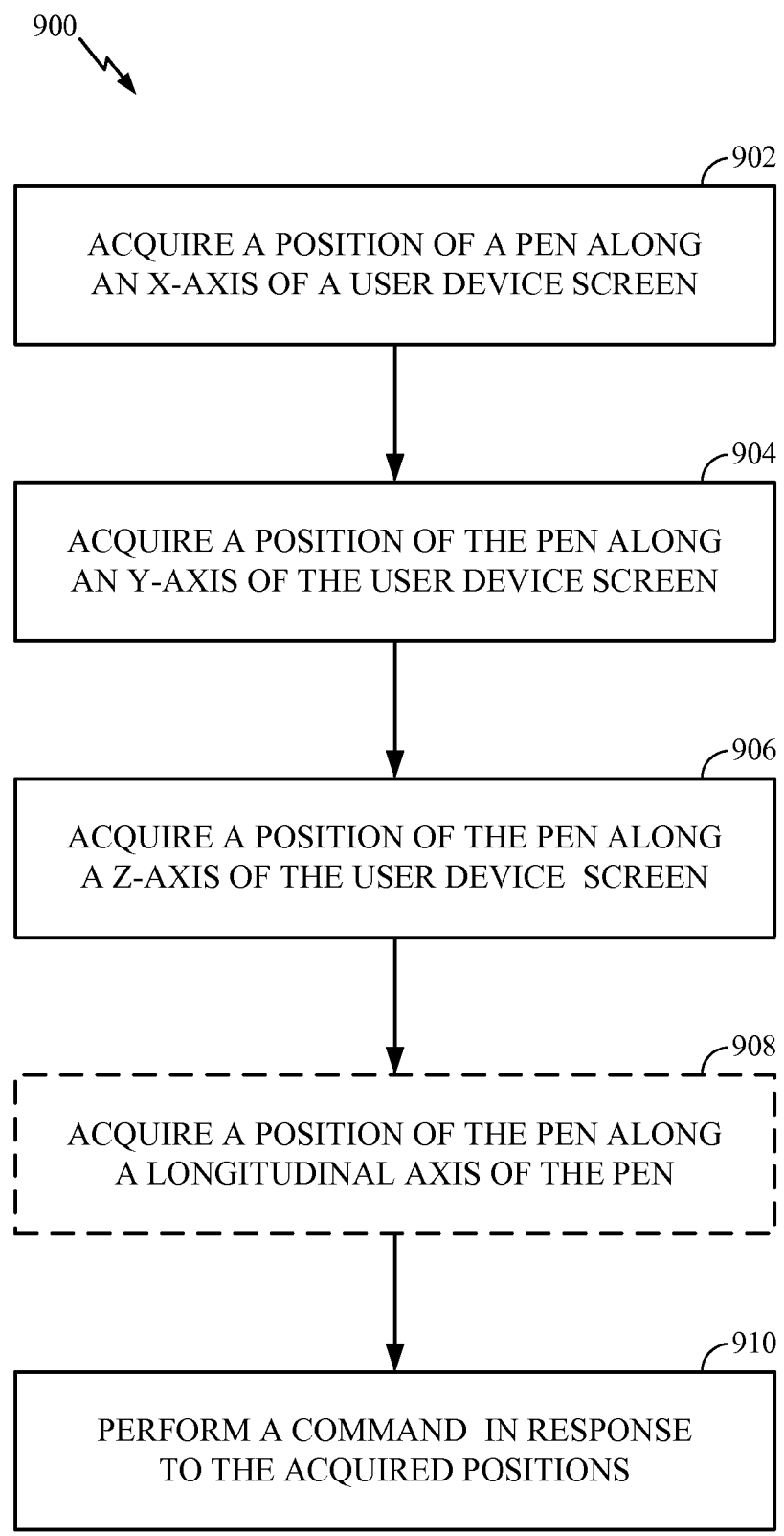
FIG. 9 is a flowchart of a method illustrating operation of an in-air pen gesture system according to the technology described herein.

FIG. 9 is a flowchart of a method 900 illustrating operation of the system 100 according to the technology described herein.

In a block 902, the method 900 acquires a position of a pen along an x-axis of a user device screen. In one example, the user device 102 acquires a position of pen 122 along the x-axis of the user device screen 104.

In a block 904, the method 900 acquires a position of a pen along a y-axis of a user device screen. In one example, the user device 102 acquires a position of pen 122 along the y-axis of the user device screen 104.

In a block 906, the method 900 acquires a position of a pen along a z-axis of a user device screen. In one example, the user device 102 acquires a position of pen 122 along the z-axis of the user device screen 104.

In a block 908, the method 900 optionally acquires a longitudinal position of a pen relative to a user device screen. In one example, the user device 102 acquires the longitudinal position of the pen 122 relative to the user device screen 104.

In a block 910, the method 900 performs a command based on the acquired positions. In one example, the user device 102 responds to gestures of the pen 122 in the x, y, z directions to perform commands related to internet browsing, e-book page turning, and the like at the user device 102.

Aspects of the technology described herein and related drawings are directed to specific implementations of the technology. Alternative implementations may be devised without departing from the scope of the technology described herein. Additionally, well-known elements of the technology will not be described in detail or will be omitted so as not to obscure the relevant details.

Although steps and decisions of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them, except where explicitly so indicated, otherwise made clear from the context, or inherently required. It should be noted, however, that in selected variants the steps and decisions are performed in the order described above. Furthermore, not every illustrated step and decision may be required in every implementation/variant in accordance with the technology described herein, while some steps and decisions that have not been specifically illustrated may be desirable or necessary in some implementation/variants in accordance with the technology described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software, or combinations of both. To show clearly this interchangeability of hardware and software, various illustrative components, blocks, modules, circuits, and steps have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present technology described herein.

The various illustrative logical blocks, modules, and circuits described in connection with the implementation disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be implemented directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. Alternatively, the processor and the storage medium may reside as discrete components in an access terminal.

The previous description of the disclosed implementations is provided to enable any person skilled in the art to make or use the technology described herein. Various modifications to these implementations will be readily apparent to those skilled in the art, and the generic principles defined herein may be applied to other implementations without departing from the spirit or scope of the technology described herein. Thus, aspects of the technology described herein are not intended to be limited to the implementations shown herein, but is to be accorded the widest scope consistent with the principles and novel features disclosed herein.

What is claimed is:

1. A method of detecting gesture commands using an ultrasonic pen and a user device, comprising:
   acquiring a plurality of positions of the ultrasonic pen along one or more of an x-axis, a y-axis, and a z-axis of the user device;
   recognizing a micro-twisting gesture of an entirety of the ultrasonic pen about a longitudinal axis of the ultrasonic pen, the micro-twisting gesture including a sequence of movements, the recognizing of the sequence of movements including:
      recognizing a first movement around the longitudinal axis; and
      recognizing a second movement, subsequent to the first movement, around the longitudinal axis in a direction opposite the first movement; and
   performing a command based on the recognized sequence of movements included in the micro-twisting gesture.

2. The method of claim 1, wherein acquiring the positions includes:
   receiving an ultrasonic signal;
   calculating a distance traveled by the ultrasonic signal; and
   identifying the plurality of acquired positions based on the calculated distance.

3. The method of claim 1, wherein the plurality of acquired positions are acquired from a top side or a bottom side of the user device.

4. The method of claim 1, wherein the plurality of acquired positions are acquired from a left side or a right side of the user device.

5. An apparatus for detecting gesture commands using an ultrasonic pen and a user device, comprising a processor and a memory, the processor and memory being configured to:
   acquire a plurality of positions of the ultrasonic pen along an x-axis, a y-axis, and a z-axis of the user device;
   recognize a micro-twisting gesture of an entirety of the ultrasonic pen about a longitudinal axis of the ultrasonic pen, the micro-twisting gesture including a sequence of movements, wherein to recognize the sequence of movements, the processor and memory are further configured to:
      recognize a first movement around the longitudinal axis; and
      recognize a second movement, subsequent to the first movement, around the longitudinal axis in a direction opposite the first movement; and
   perform a command based on the recognized sequence of movements included in the micro-twisting gesture.

6. The apparatus of claim 5, further comprising a microphone array configured to receive an ultrasonic signal, wherein the processor and memory are further configured to:
   calculate a distance traveled by the ultrasonic signal; and
   identify the plurality of acquired positions based on the calculated distance.

7. The apparatus of claim 5, wherein the first movement is in a first direction along one or more of the x-axis, the y-axis, and the z-axis, and the second movement is in a second direction along one or more of the x-axis, the y-axis, and the z-axis, the second direction being different from the first direction.

8. The apparatus of claim 5, wherein the plurality of acquired positions are acquired from a top side or a bottom side of the user device.

9. A non-transitory computer-readable storage medium including information that, when accessed by a machine, cause the machine to perform operations for detecting gesture commands using an ultrasonic pen and a user device, the operations comprising:
   acquiring a plurality of positions of the ultrasonic pen along one or more of an x-axis, a y-axis, and a z-axis of the user device;
   recognizing a micro-twisting gesture of an entirety of the ultrasonic pen about a longitudinal axis of the ultrasonic pen, the micro-twisting gesture including a sequence of movements, the recognizing of the sequence of movements including:
      recognizing a first movement around the longitudinal axis; and
      recognizing a second movement, subsequent to the first movement, around the longitudinal axis in a direction opposite the first movement; and
   performing a command based on the recognized sequence of movements included in the micro-twisting gesture.

10. The non-transitory computer-readable storage medium of claim 9, wherein acquiring the positions includes:
   receiving an ultrasonic signal;
   calculating a distance traveled by the ultrasonic signal; and
   identifying the plurality of acquired positions based on the calculated distance.

11. The non-transitory computer-readable storage medium of claim 9, wherein the plurality of acquired positions are acquired from a left side or a right side of the user device.

12. The non-transitory computer-readable storage medium of claim 9, wherein the plurality of acquired positions are acquired from a top side or a bottom side of the user device.

* * * * *